United States Patent
Needham

(10) Patent No.: US 9,435,655 B2
(45) Date of Patent: Sep. 6, 2016

(54) COORDINATED CROWD DISPERSAL NAVIGATION

(71) Applicant: Intel Corporation, Santa Clara, CA (US)

(72) Inventor: Bradford H. Needham, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/564,355

(22) Filed: Dec. 9, 2014

(65) Prior Publication Data

US 2016/0161269 A1   Jun. 9, 2016

(51) Int. Cl.
  *G06K 5/00* (2006.01)
  *G01C 21/34* (2006.01)
(52) U.S. Cl.
  CPC ..................................... *G01C 21/34* (2013.01)
(58) Field of Classification Search
  CPC ........................... G07F 7/1008; G06Q 20/341
  USPC ...................................... 235/382.5, 380, 382
  See application file for complete search history.

(56) References Cited

U.S. PATENT DOCUMENTS

| | | | |
|---|---|---|---|
| 7,259,656 B1 | 8/2007 | Wright | |
| 7,579,945 B1 | 8/2009 | Richter et al. | |
| 2003/0050039 A1 | 3/2003 | Baba et al. | |
| 2007/0030127 A1 | 2/2007 | Reed | |
| 2007/0049259 A1 | 3/2007 | Onishi et al. | |
| 2010/0121567 A1 | 5/2010 | Mendelson | |
| 2014/0293865 A1* | 10/2014 | Shi et al. | G08B 21/10 370/312 |
| 2015/0358796 A1* | 12/2015 | Sarna, II | H04W 4/22 455/404.2 |

FOREIGN PATENT DOCUMENTS

| | | |
|---|---|---|
| CN | 103780703 A | 5/2014 |
| WO | WO-2014121329 A1 | 8/2014 |
| WO | WO-2015084415 A1 | 6/2015 |

OTHER PUBLICATIONS

Marcou, Dan, "The 'Madison Method' for crowd control", PoliceOne.com News, [Online]. Retrieved from the Internet: <URL: http://www.policeone.com/CrowdControl/articles/3361291, (Mar. 22, 2011), 3 pgs.

"International Application U.S. Appl. No. PCT/US2015/061050, International Search Report mailed Feb. 24, 2016", 3 pgs.

"International Application Serial No. PCT/US2015/061050, Written Opinion mailed Feb. 24, 2016", 8 pgs.

\* cited by examiner

*Primary Examiner* — Karl D Frech
(74) *Attorney, Agent, or Firm* — Schwegman Lundberg & Woessner, P.A.

(57) ABSTRACT

Various systems and methods for coordinating crowd dispersal are described herein. A system for coordinating crowd dispersal includes a user module to: identify a plurality of parties at a venue, each party having at least one person associated with it; and identify a location of each of the plurality of parties within the venue; a route module to calculate a traffic dispersion plan designed to disperse the plurality of parties from the venue, the traffic dispersion plan including a route for each of the plurality of parties; and a communication module to communicate routes from the traffic dispersion plan to respective parties of the plurality of parties.

23 Claims, 3 Drawing Sheets

COORDINATED CROWD DISPERSAL NAVIGATION

TECHNICAL FIELD

Embodiments described herein generally relate to on-site navigation and in particular, to coordinated crowd dispersal navigation.

BACKGROUND

Hundreds of thousands of people attend events at public and private venues every year. Concerts, art festivals, corporate conventions, and political events are merely a few examples of such events. Moving large crowds of people typically results in congestion, which may be result in unsafe conditions or difficult navigation when dispersing from an event.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Systems and methods described herein provide coordinated crowd dispersal navigation. In general, crowds of people do not cooperate well and fail to disperse in an optimal manner. Individuals tend to exit an area by the same path that they entered rather than by the nearest exit. Others tend to follow groups rather than separating and finding a better exit route. Each mentality is easily understood in that people will tend to avoid unfamiliar pathways and feel more comfortable in groups. However, such behavior may result in less than optimal crowd dispersion.

In many cases, an attendee at an event is not familiar with the venue. While navigation applications and maps may be useful to guide a person from one location to another, such devices are not useful by themselves to coordinate the movement of multiple people or to optimize the movement of groups of people. When leaving an event, either at the normal conclusion of the event or during an emergency situation, the attendee may not know the layout of the venue or the locations of all of the exits. Further, the attendee will not know the overall traffic flow patterns of all of the attendees leaving the event. The embodiments described herein provide an alternative, interactive way of assisting crowd dispersal.

Coordinated dispersal is desirable in a number of various scenarios. Some common reasons for dispersal include, but are not limited to, emergency evacuation from an area, normal clearing of a venue after an event has concluded, dispersal of a crowd from a protest or public gathering, such as a fireworks display, political speech, or parade.

Systems and methods described herein provide a dispersion system to compute exit routes for people or parties at an event and communicate the exit routes to those people or parties via personal navigation devices. Personal navigation devices may be mobile devices such as smartphones, laptops, tablet computers, wearable devices, and the like, or may be incorporated into a vehicle, such as in an interactive vehicle infotainment system. Further, the dispersion system may take into account abilities or limitations of individuals (e.g., a wheelchair bound person) when computing the routes.

Figure 1:
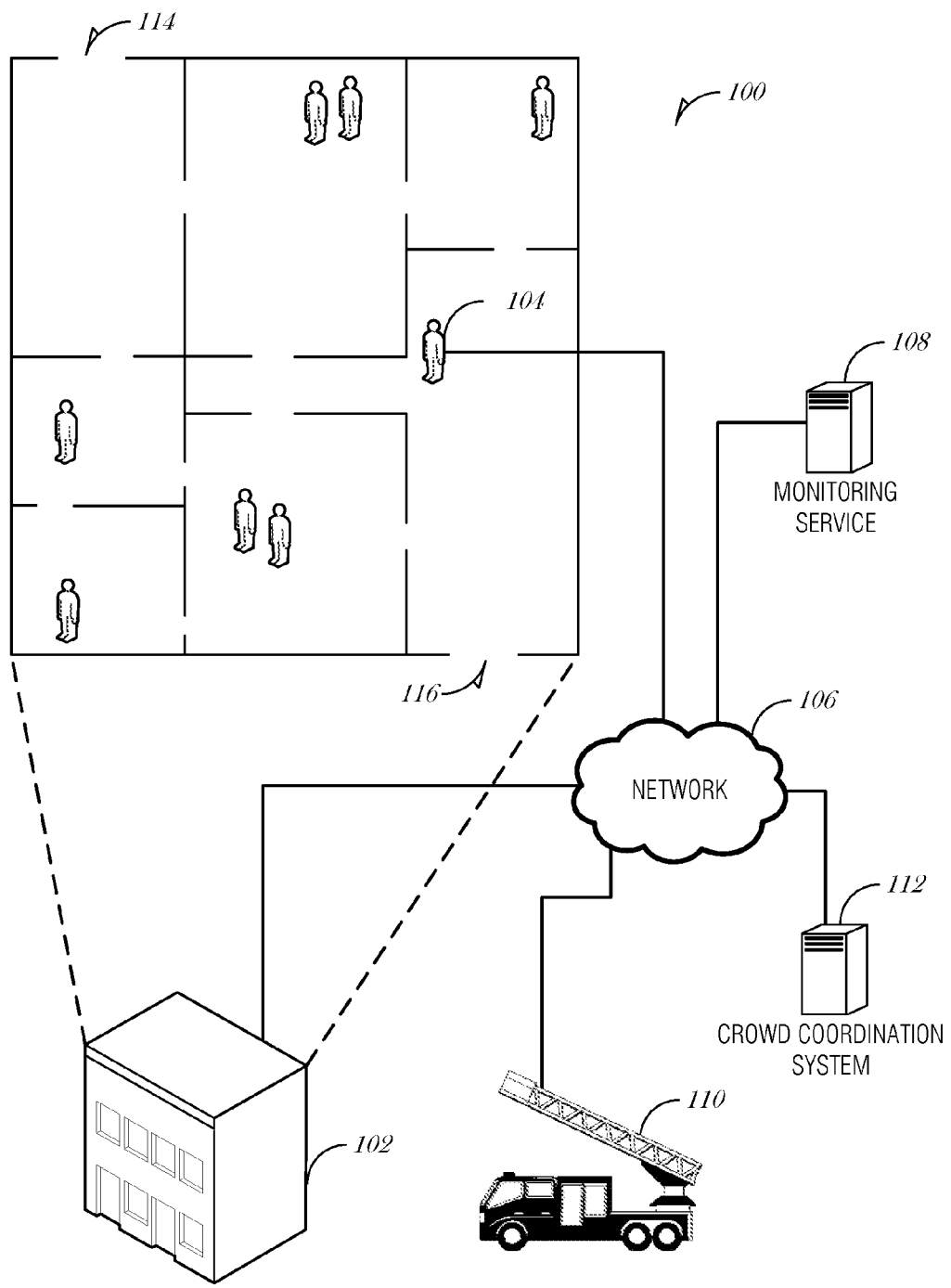
FIG. 1 is a schematic drawing illustrating an environment, according to an embodiment.

FIG. 1 is a schematic drawing illustrating an environment 100, according to an embodiment. A venue 102 may host an event, such as a conference, a meeting, a party, a concert, or the like. When an attendee 104 enters the premises of the venue 102, the attendee 104 may be presented the option to download an application to a mobile device. The mobile device may be a smart phone, personal digital assistant, wearable device, tablet, hybrid, or other type of portable computing device. The mobile device may be provided to the attendee 104 by the organizers of the event or may be personally owned by the attendee 104. The attendee 104 may acquire the device or application well before entering the venue 102, e.g., by purchasing it in anticipation of attending the venue 102. The application may be venue-specific or venue-independent and later adapted for a specific venue/event by automatically downloading venue-specific information when appropriate. The application may provide additional information about the event, the venue 102, speakers or presenters at the event, hotel or eating options nearby the venue 102, transportation options to and from the venue 102, or the like. In an embodiment, the application may provide one or more maps of the venue 102, which may be used by the event organizer to advertise various meetings, displays, presentations, or other events within the larger event.

The venue 102 may be equipped with one or more monitoring systems, such as a fire alarm system, a security system, or the like. The monitoring systems may include various sensors such as cameras, smoke detectors, chemical sensors, wind sensors, or the like. The monitoring system may be networked via a network 106, to a central monitoring service 108. The monitoring service 108 may monitor for alarm conditions at the venue, such as a security alarm or a fire alarm. When such an alarm is detected, the monitoring service 108 may alert emergency response personnel, such as fire response personnel 110.

Upon detection of an emergency event, such as a fire, the application installed on the attendee's mobile device may alert the attendee 104 of the situation and provide instructions on evacuation or other emergency response. For example, in the event of a fire, the application may provide instructions directing the attendee 104 to a particular exit route. When an emergency occurs, the standard exit information or emergency instructions may be displayed. As the emergency continues, updated information may be sent to the attendee 104. If communications are lost during the evacuation, the most current information may be stored at the attendee's mobile device for continued display. Other emergency events may be detected and handled with the systems and methods described herein. Emergency events include explosions, chemical or biological spills, physical security breaches (e.g., pirates, a cougar, or other incursion), etc.

In a non-emergency crowd dispersal, such as at the conclusion of an event, the monitoring systems at the venue 102 may be used to monitor the locations and movement of attendees 104.

A crowd coordination system 112 may be used to provide exit route instructions to attendees 104. The crowd coordination system 112 may be triggered by the monitoring service 108, such that when an emergency occurs or is detected, the crowd coordination system 112 may initiate processes to identify attendees 104 and their locations, determine routes, and monitor the dispersal or evacuation of the attendees 104 from the venue 102. Emergency response personnel 110 may have access to the monitoring service 108 and the crowd coordination system 112 in order to monitor the status of evacuation.

During the course of crowd dispersal, the crowd coordination system 112 may provide updated instructions to the attendee 104 via the network 106 and the mobile device used by the attendee 104. The instructions may be provided to attendees 104 in various ways, such as with a map of the venue 102, turn-by-turn instructions, or verbal instructions. Using the location information of the mobile devices of the attendees 104, emergency response personnel may view approximate locations of attendees 104 (e.g., on a map of the venue 102), crowd dispersal statistics (e.g., approximate number of people still inside or outside of the venue 102), or other information. For example, if an exit 114 is congested (e.g., blocked by a fire, debris, or fleeing attendees), the crowd coordination system 112 may redirect attendees 104 to another exit 116. Thus, the crowd coordination system 112 provides a mechanism to control traffic flow of the evacuation or other dispersal.

The crowd coordination system 112 may use various inputs when calculating exit routes for attendees 104. Biometric or physiological information may be obtained from sensors built into a mobile device used by an attendee 104 or from sensors installed at the venue 102 (e.g., cameras). Such information about an attendee 104 may be used to alter an exit route for the attendee 104. For example, if the attendee 104 is experiencing a panic attack, then the attendee 104 may be given some priority and a revised exit route may be communicated to the attendee 104. The attendee 104 may be given reassuring messages in addition to route information in an attempt to relieve the attendee's distress.

Another input is environmental data, such as a type of hazard or emergency event (e.g., fire, flood, chemical spill, pirate, cougar attack, etc.), a location of the hazard or emergency event (e.g., a location of the fire), progression of the hazard (e.g., where the fire is moving to in the next minutes or moments), or the like. Environmental information may also include information related to structural integrity (e.g., building integrity), location of attendees to indicate congestion, weather data, and the like. Such environmental information may be used to adjust routes, which may then be communicated to the attendees 104. For example, as a fire progresses and blocks an exit or renders a portion of a building unsafe or inaccessible, the crowd coordination system 112 may reroute attendees 104 to different exits.

The network 106 provides a mechanism for real-time communication between the individual mobile devices and the crowd coordination system 112. This communication may use peer-to-peer, mesh network, or cloud-based client-server methods. Although illustrated in one system in FIG. 1, it is understood that the crowd coordination system 112 may be hosted in a single location (e.g., a server), in a cloud-based system, or distributed across some or all of the attendees' 104 computing devices.

Figure 2:
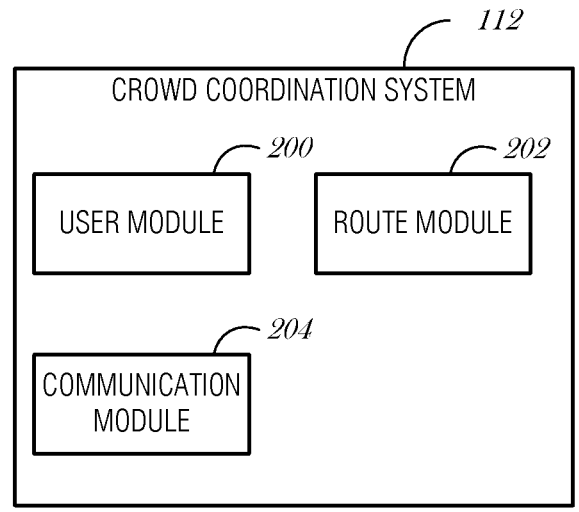
FIG. 2 is a block diagram illustrating a system for coordinating crowd dispersal, according to an embodiment.

FIG. 2 is a block diagram illustrating a system for coordinating crowd dispersal 112, according to an embodiment. The system 112 may include a user module 200, a route module 202, and a communication module 204. The user module 200 may be configured to identify a plurality of parties at a venue, each party having at least one person associated with it, and identify a location of each of the plurality of parties within the venue. It is understood that the venue may be any place where people gather. Thus, in various embodiments, the venue is a building or an outdoor location. In order to identify the plurality of parties at the venue, in an embodiment, the user module 200 is to query mobile devices associated with each of the plurality of parties and receive an identity of each of the plurality of parties from the respective mobile devices. Such identity may be pseudonymous (such as a user ID), in order to protect the privacy of the parties. Such query and response may be performed at the time of registration, such as when an attendee or party first arrives at the venue. Alternatively, a push mechanism may be used where the system passively receives the identity information from the mobile devices associated with the plurality of parties. The location of each of the plurality of parties may be obtained with environmental sensors (e.g., cameras installed in the venue) or from sensors embedded in devices in use by the parties (e.g., a GPS module in the mobile device).

The route module 202 may be configured to calculate a traffic dispersion plan designed to disperse the plurality of parties from the venue, the traffic dispersion plan including a route for each of the plurality of parties. In order to calculate the traffic dispersion plan, in an embodiment, the route module 202 is to access preferences associated with a party of the plurality of parties and calculate the traffic dispersion plan with the preferences. In an embodiment, the preferences include a physical disability of the party. In an embodiment, the preferences indicate a group including the party and at least one other party of the plurality of parties. For example, people making up a family may indicate that they want to stay together when dispersing from an event.

In order to calculate the traffic dispersion plan, in an embodiment, the route module 202 is to access environmental data related to the venue and calculate the traffic dispersion plan with the environmental data. In an embodiment, the environmental data includes at least one of: wind speed, wind direction, temperature, or time. In an embodiment, the environmental data includes a location of a hazard. In an embodiment, the hazard is a fire. In another embodiment, the hazard is a chemical spill. Thus, for example, when the hazard is a chemical spill, the system for coordinating crowd dispersal 112 may take into account wind speed and direction when calculating the dispersion routes so that the people are routed away from hazardous fumes.

The communication module 204 may be configured to communicate routes from the traffic dispersion plan to respective parties of the plurality of parties. In an embodiment, to communicate routes from the traffic dispersion plan, the communication module 204 is to communicate a turn-by-turn route to respective parties of the plurality of parties. For example, routes may be communicated to the party with one or more textual instructions, such as "Proceed ahead for 100 feet" or "In 20 feet, turn left and proceed through the door." In an embodiment, to communicate routes from the traffic dispersion plan, the communication module 204 is to communicate a graphical map to respective parties of the plurality of parties. The map may be presented with the turn-by-turn instructions. The turn-by-turn instructions may be presented graphically, via audio (e.g., verbally or via audio-icons), or via haptic feedback such as with one or more vibrators that indicate a left or right turn.

In a further embodiment, the system for coordinating crowd dispersal 112 includes an event handler module to receive an indication of a triggering event at the venue, after which the system for coordinating crowd dispersal 112 identifies parties, calculates routes, and communicates the routes. In an embodiment, the triggering event is an emergency event.

The system 112 may periodically or recurrently recalculate routes during the crowd dispersal. Thus, in an embodiment, the user module 200 is to identify updated locations of each of the plurality of parties within the venue, the route module 202 is to recalculate the traffic dispersion plan to obtain an updated traffic dispersion plan, the updated traffic dispersion plan including an updated route for each of the plurality of parties, and the communication module 204 is to communicate the updated routes from the updated traffic dispersion plan to respective parties of the plurality of parties.

Figure 3:
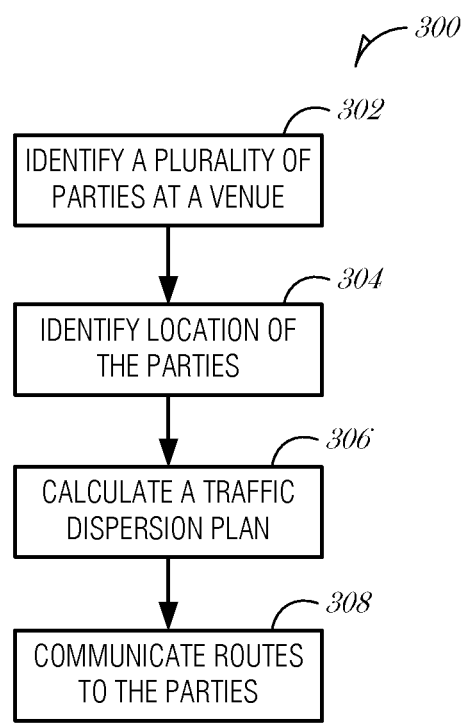
FIG. 3 is a flowchart illustrating a method of coordinating crowd dispersal, according to an embodiment.

FIG. 3 is a flowchart illustrating a method 300 of coordinating crowd dispersal, according to an embodiment. At block 302, at a processing system, a plurality of parties at a venue are identified, each party having at least one person associated with it. In an embodiment, the venue is a building. In an embodiment, the venue is an outdoor location. The identities may be obtained either through querying devices ("pull" protocols) or with passive reception ("push" protocols). In an embodiment, identifying the plurality of parties at the venue comprises querying mobile devices associated with each of the plurality of parties and receiving an identity of each of the plurality of parties from the respective mobile devices. In another embodiment, identifying the plurality of parties at the venue comprises receiving via a passive reception mechanism, an identity of each of the plurality of parties from mobile devices associated with each of the plurality of parties.

At block 304, at the processing system, a location of each of the plurality of parties within the venue is identified.

At block 306, at the processing system, a traffic dispersion plan designed to disperse the plurality of parties from the venue is calculated, the traffic dispersion plan including a route for each of the plurality of parties.

In an embodiment, calculating the traffic dispersion plan comprises accessing preferences associated with a party of the plurality of parties and calculating the traffic dispersion plan with the preferences. In an embodiment, the preferences include a physical disability of the party. In an embodiment, the preferences indicate a group including the party and at least one other party of the plurality of parties.

In an embodiment, calculating the traffic dispersion plan comprises: accessing environmental data related to the venue and calculating the traffic dispersion plan with the environmental data. In an embodiment, the environmental data includes at least one of: wind speed, wind direction, temperature, or time. In an embodiment, the environmental data includes a location of a hazard. In an embodiment, the hazard is a fire. In an embodiment, the hazard is a chemical spill.

At block 308, routes in the traffic dispersion plan are communicated from the processing system to respective parties of the plurality of parties. In an embodiment, communicating routes from the traffic dispersion plan comprises communicating a turn-by-turn route to respective parties of the plurality of parties. In an embodiment, communicating routes from the traffic dispersion plan comprises communicating a graphical map to respective parties of the plurality of parties.

In a further embodiment, the method 300 includes receiving an indication of a triggering event at the venue and in response to receiving the indication, performing the operations the method 300. In an embodiment, the triggering event is an emergency event.

In a further embodiment, the method 300 includes identifying updated locations of each of the plurality of parties within the venue, recalculating the traffic dispersion plan to obtain an updated traffic dispersion plan, the updated traffic dispersion plan including an updated route for each of the plurality of parties, and communicating the updated routes from the updated traffic dispersion plan to respective parties of the plurality of parties.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 4:
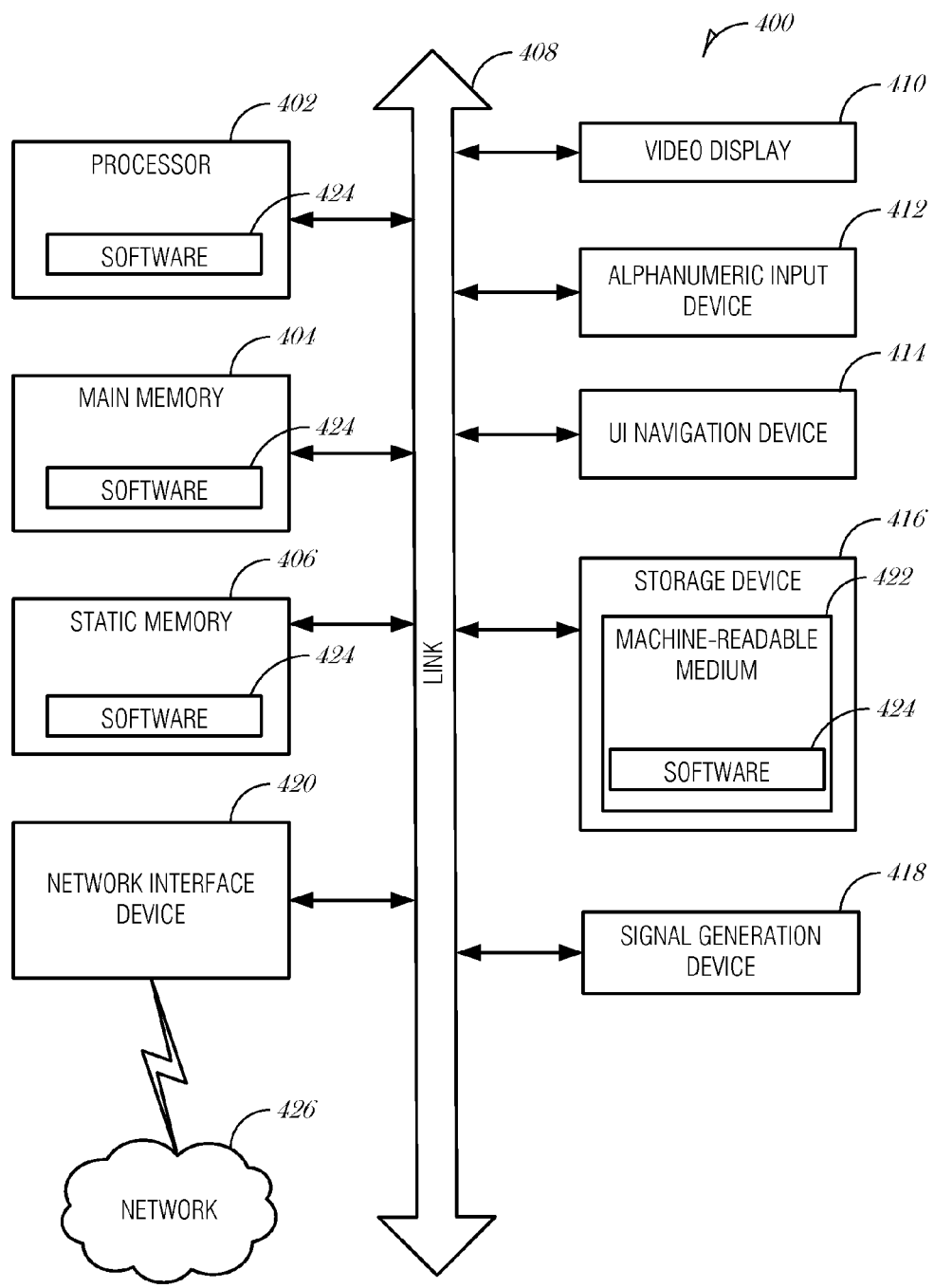
FIG. 4 is a block diagram illustrating an example machine upon which any one or more of the techniques (e.g., methodologies) discussed herein may perform, according to an example embodiment.

FIG. 4 is a block diagram illustrating a machine in the example form of a computer system 400, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 400 includes at least one processor 402 (e.g., a central processing unit (CPU), a graphics processing unit (GPU) or both, processor cores, compute nodes, etc.), a main memory 404 and a static memory 406, which communicate with each other via a link 408 (e.g., bus). The computer system 400 may further include a video display unit 410, an alphanumeric input device 412 (e.g., a keyboard), and a user interface (UI) navigation device 414 (e.g., a mouse). In one embodiment, the video display unit 410, input device 412 and UI navigation device 414 are incorporated into a touch screen display. The computer system 400 may additionally include a storage device 416 (e.g., a drive unit), a signal generation device 418 (e.g., a speaker), a network interface device 420, and one or more sensors or actuators (not shown), such as a global positioning system (GPS) sensor, compass, accelerometer, audio generation module, vibrators, or other sensors or actuators.

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the computer system 400, with the main memory 404, static memory 406, and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 includes subject matter for coordinating crowd dispersal (such as a device, apparatus, or machine) comprising: a user module to: identify a plurality of parties at a venue, each party having at least one person associated with it; and identify a location of each of the plurality of parties within the venue; a route module to calculate a traffic dispersion plan designed to disperse the plurality of parties from the venue, the traffic dispersion plan including a route for each of the plurality of parties; and a communication module to communicate routes from the traffic dispersion plan to respective parties of the plurality of parties.

In Example 2, the subject matter of Example 1 may include, wherein the venue is a building.

In Example 3, the subject matter of any one of Examples 1 to 2 may include, wherein the venue is an outdoor location.

In Example 4, the subject matter of any one of Examples 1 to 3 may include, wherein to identify the plurality of parties at the venue, the user module is to: query mobile devices associated with each of the plurality of parties; and receive an identity of each of the plurality of parties from the respective mobile devices.

In Example 5, the subject matter of any one of Examples 1 to 4 may include, wherein to identify the plurality of parties at the venue, the user module is to: receive via a passive reception mechanism, an identity of each of the plurality of parties from mobile devices associated with each of the plurality of parties.

In Example 6, the subject matter of any one of Examples 1 to 5 may include, wherein to calculate the traffic dispersion plan, the route module is to: access preferences associated with a party of the plurality of parties; and calculate the traffic dispersion plan with the preferences.

In Example 7, the subject matter of any one of Examples 1 to 6 may include, wherein the preferences include a physical disability of the party.

In Example 8, the subject matter of any one of Examples 1 to 7 may include, wherein the preferences indicate a group including the party and at least one other party of the plurality of parties.

In Example 9, the subject matter of any one of Examples 1 to 8 may include, wherein to calculate the traffic dispersion plan, the route module is to: access environmental data related to the venue; and calculate the traffic dispersion plan with the environmental data.

In Example 10, the subject matter of any one of Examples 1 to 9 may include, wherein the environmental data includes at least one of: wind speed, wind direction, temperature, or time.

In Example 11, the subject matter of any one of Examples 1 to 10 may include, wherein the environmental data includes a location of a hazard.

In Example 12, the subject matter of any one of Examples 1 to 11 may include, wherein the hazard is a fire.

In Example 13, the subject matter of any one of Examples 1 to 12 may include, wherein the hazard is a chemical spill.

In Example 14, the subject matter of any one of Examples 1 to 13 may include, wherein to communicate routes from the traffic dispersion plan, the communication module is to: communicate a turn-by-turn route to respective parties of the plurality of parties.

In Example 15, the subject matter of any one of Examples 1 to 14 may include, wherein to communicate routes from the traffic dispersion plan, the communication module is to: communicate a graphical map to respective parties of the plurality of parties.

In Example 16, the subject matter of any one of Examples 1 to 15 may include, further comprising: an event handler module to receive an indication of a triggering event at the venue; and wherein in response to receiving the indication, the system is to perform the operations of Example 1.

In Example 17, the subject matter of any one of Examples 1 to 16 may include, wherein the triggering event is an emergency event.

In Example 18, the subject matter of any one of Examples 1 to 17 may include, wherein: the user module is to identify updated locations of each of the plurality of parties within the venue; the route module is to recalculate the traffic dispersion plan to obtain an updated traffic dispersion plan, the updated traffic dispersion plan including an updated route for each of the plurality of parties; and the communication module is to communicate the updated routes from the updated traffic dispersion plan to respective parties of the plurality of parties.

Example 19 includes subject matter for coordinating a crowd dispersal (such as a method, means for performing acts, machine readable medium including instructions that when performed by a machine cause the machine to performs acts, or an apparatus to perform) comprising: identifying, at a processing system, a plurality of parties at a venue, each party having at least one person associated with it; identifying, at the processing system, a location of each of the plurality of parties within the venue; calculating, at the processing system, a traffic dispersion plan designed to disperse the plurality of parties from the venue, the traffic dispersion plan including a route for each of the plurality of parties; and communicating from the processing system, routes in the traffic dispersion plan to respective parties of the plurality of parties.

In Example 20, the subject matter of Example 19 may include, wherein the venue is a building.

In Example 21, the subject matter of any one of Examples 19 to 20 may include, wherein the venue is an outdoor location.

In Example 22, the subject matter of any one of Examples 19 to 21 may include, wherein identifying the plurality of parties at the venue comprises: querying mobile devices associated with each of the plurality of parties; and receiving an identity of each of the plurality of parties from the respective mobile devices.

In Example 23, the subject matter of any one of Examples 19 to 22 may include, wherein identifying the plurality of parties at the venue comprises: receiving via a passive reception mechanism, an identity of each of the plurality of parties from mobile devices associated with each of the plurality of parties.

In Example 24, the subject matter of any one of Examples 19 to 23 may include, wherein calculating the traffic dispersion plan comprises: accessing preferences associated with a party of the plurality of parties; and calculating the traffic dispersion plan with the preferences.

In Example 25, the subject matter of any one of Examples 19 to 24 may include, wherein the preferences include a physical disability of the party.

In Example 26, the subject matter of any one of Examples 19 to 25 may include, wherein the preferences indicate a group including the party and at least one other party of the plurality of parties.

In Example 27, the subject matter of any one of Examples 19 to 26 may include, wherein calculating the traffic dispersion plan comprises: accessing environmental data related to the venue; and calculating the traffic dispersion plan with the environmental data.

In Example 28, the subject matter of any one of Examples 19 to 27 may include, wherein the environmental data includes at least one of: wind speed, wind direction, temperature, or time.

In Example 29, the subject matter of any one of Examples 19 to 28 may include, wherein the environmental data includes a location of a hazard.

In Example 30, the subject matter of any one of Examples 19 to 29 may include, wherein the hazard is a fire.

In Example 31, the subject matter of any one of Examples 19 to 30 may include, wherein the hazard is a chemical spill.

In Example 32, the subject matter of any one of Examples 19 to 31 may include, wherein communicating routes from the traffic dispersion plan comprises: communicating a turn-by-turn route to respective parties of the plurality of parties.

In Example 33, the subject matter of any one of Examples 19 to 32 may include, wherein communicating routes from the traffic dispersion plan comprises: communicating a graphical map to respective parties of the plurality of parties.

In Example 34, the subject matter of any one of Examples 19 to 33 may include, further comprising: receiving an indication of a triggering event at the venue; and in response to receiving the indication, performing the operations of Example 19.

In Example 35, the subject matter of any one of Examples 19 to 34 may include, wherein the triggering event is an emergency event.

In Example 36, the subject matter of any one of Examples 19 to 35 may include, further comprising: identifying updated locations of each of the plurality of parties within the venue; recalculating the traffic dispersion plan to obtain an updated traffic dispersion plan, the updated traffic dispersion plan including an updated route for each of the plurality of parties; and communicating the updated routes from the updated traffic dispersion plan to respective parties of the plurality of parties.

Example 37 includes at least one machine-readable medium including instructions, which when executed by a machine, cause the machine to perform operations of any of the Examples 19-36.

Example 38 includes an apparatus comprising means for performing any of the Examples 19-36.

Example 39 includes subject matter for coordinating crowd dispersal (such as a device, apparatus, or machine) comprising: means for identifying, at a processing system, a plurality of parties at a venue, each party having at least one person associated with it; means for identifying, at the processing system, a location of each of the plurality of parties within the venue; means for calculating, at the processing system, a traffic dispersion plan designed to disperse the plurality of parties from the venue, the traffic dispersion plan including a route for each of the plurality of parties; and means for communicating from the processing system, routes in the traffic dispersion plan to respective parties of the plurality of parties.

In Example 40, the subject matter of Example 39 may include, wherein the venue is a building.

In Example 41, the subject matter of any one of Examples 39 to 40 may include, wherein the venue is an outdoor location.

In Example 42, the subject matter of any one of Examples 39 to 41 may include, wherein the means for identifying the plurality of parties at the venue comprise: means for querying mobile devices associated with each of the plurality of parties; and means for receiving an identity of each of the plurality of parties from the respective mobile devices.

In Example 43, the subject matter of any one of Examples 39 to 42 may include, wherein the means for identifying the plurality of parties at the venue comprise: means for receiving via a passive reception mechanism, an identity of each of the plurality of parties from mobile devices associated with each of the plurality of parties.

In Example 44, the subject matter of any one of Examples 39 to 43 may include, wherein the means for calculating the traffic dispersion plan comprise: means for accessing preferences associated with a party of the plurality of parties; and means for calculating the traffic dispersion plan with the preferences.

In Example 45, the subject matter of any one of Examples 39 to 44 may include, wherein the preferences include a physical disability of the party.

In Example 46, the subject matter of any one of Examples 39 to 45 may include, wherein the preferences indicate a group including the party and at least one other party of the plurality of parties.

In Example 47, the subject matter of any one of Examples 39 to 46 may include, wherein the means for calculating the traffic dispersion plan comprise: means for accessing environmental data related to the venue; and means for calculating the traffic dispersion plan with the environmental data.

In Example 48, the subject matter of any one of Examples 39 to 47 may include, wherein the environmental data includes at least one of: wind speed, wind direction, temperature, or time.

In Example 49, the subject matter of any one of Examples 39 to 48 may include, wherein the environmental data includes a location of a hazard.

In Example 50, the subject matter of any one of Examples 39 to 49 may include, wherein the hazard is a fire.

In Example 51, the subject matter of any one of Examples 39 to 50 may include, wherein the hazard is a chemical spill.

In Example 52, the subject matter of any one of Examples 39 to 51 may include, wherein the means for communicating routes from the traffic dispersion plan comprise: means for communicating a turn-by-turn route to respective parties of the plurality of parties.

In Example 53, the subject matter of any one of Examples 39 to 52 may include, wherein the means for communicating routes from the traffic dispersion plan comprise: means for communicating a graphical map to respective parties of the plurality of parties.

In Example 54, the subject matter of any one of Examples 39 to 53 may include, further comprising: means for receiving an indication of a triggering event at the venue; and in response to receiving the indication, means for performing the operations of Example 39.

In Example 55, the subject matter of any one of Examples 39 to 54 may include, wherein the triggering event is an emergency event.

In Example 56, the subject matter of any one of Examples 39 to 55 may include, further comprising: means for identifying updated locations of each of the plurality of parties within the venue; means for recalculating the traffic dispersion plan to obtain an updated traffic dispersion plan, the updated traffic dispersion plan including an updated route for each of the plurality of parties; and means for communicating the updated routes from the updated traffic dispersion plan to respective parties of the plurality of parties.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for coordinating crowd dispersal, the system comprising:
    a user module to perform operations that:
        identify a plurality of parties at a venue, each party having at least one person and a mobile device associated with it, wherein the plurality of parties includes a first party and a second party; and
        identify a location of each of the plurality of parties within the venue;
    a route module to perform operations that:
        calculate a traffic dispersion plan designed to disperse the plurality of parties from the venue, the traffic dispersion plan including a route for each of the plurality of parties, wherein the route for the first party differs from the route for the second party; and
        recalculate dynamic route updates to the traffic dispersion plan, wherein the dynamic route updates are designed to further disperse the plurality of parties from the venue based on deviation from the traffic dispersion plan, and wherein the dynamic route updates to the traffic dispersion plan are designed to update the traffic dispersion plan based on a delay of navigating the route for the first party and based on congestion in the route for the second party;
    a communication module to perform operations that:
        communicate routes from the traffic dispersion plan to mobile devices associated with respective parties of the plurality of parties, the respective parties including the first party of the plurality of parties and the second party of the plurality of parties;
        receive location updates from the mobile devices associated with the respective parties of the plurality of parties, the location updates including locations that indicate the delay of navigating the route for the first party and the congestion in the route for the second party; and
        communicate the dynamic route updates to the mobile devices associated with the respective parties of the plurality of parties;
    wherein the dynamic route updates are recalculated by the route module in response to receipt of the location updates from the mobile devices that indicate the delay of navigating the route for the first party and the congestion in the route for the second party.

2. The system of claim 1, wherein the venue is a building.

3. The system of claim 1, wherein the venue is an outdoor location.

4. The system of claim 1, wherein to identify the plurality of parties at the venue, the user module is further to perform operations that:
    query the mobile devices associated with each of the plurality of parties; and
    receive an identity of each of the plurality of parties from the respective mobile devices.

5. The system of claim 1, wherein to identify the plurality of parties at the venue, the user module is further to perform operations that:
    receive via a passive reception mechanism, an identity of each of the plurality of parties from the mobile devices associated with each of the plurality of parties.

6. The system of claim 1, wherein to calculate the traffic dispersion plan, the route module is further to perform operations that:
    access preferences associated with a party of the plurality of parties; and
    calculate the traffic dispersion plan with the preferences.

7. The system of claim 6, wherein the preferences include a physical disability of the party.

8. The system of claim 6, wherein the preferences indicate a group including the party and at least one other party of the plurality of parties.

9. The system of claim 6, wherein to calculate the traffic dispersion plan, the route module is further to perform operations that:
    access environmental data related to the venue; and
    calculate the traffic dispersion plan with the environmental data.

10. The system of claim 9, wherein the environmental data includes at least one of: wind speed, wind direction, temperature, or time.

11. The system of claim 10, wherein the environmental data includes a location of a hazard.

12. The system of claim 11, wherein the hazard is a fire.

13. The system of claim 11, wherein the hazard is a chemical spill.

14. The system of claim 1, wherein to communicate routes from the traffic dispersion plan, the communication module is further to perform operations that:
    communicate a turn-by-turn route to the mobile devices associated with respective parties of the plurality of parties.

15. The system of claim 1, wherein to communicate routes from the traffic dispersion plan, the communication module is further to perform operations that:
    communicate a graphical map to the mobile devices associated with respective parties of the plurality of parties.

16. The system of claim 1, further comprising:
    an event handler module to perform operations that receive an indication of a triggering event at the venue;
    wherein in response to receipt of the indication, the user module, the route module, and the communication module operate to respectively identify the location of each of the plurality of parties, calculate the traffic dispersion plan, and communicate the routes from the traffic dispersion plan.

17. The system of claim 16, wherein the triggering event is an emergency event.

18. A method of coordinating crowd dispersal, the method comprising electronic operations performed at a processing system, the electronic operations including:
    identifying a plurality of parties at a venue, each party having at least one person and a mobile device associated with it, wherein the plurality of parties includes a first party and a second party;
    identifying a location of each of the plurality of parties within the venue;
    calculating a traffic dispersion plan designed to disperse the plurality of parties from the venue, the traffic dispersion plan including a route for each of the plurality of parties, wherein the route for the first party differs from the route for the second party;

recalculate dynamic route updates to the traffic dispersion plan, wherein the dynamic route updates are designed to further disperse the plurality of parties from the venue based on deviation from the traffic dispersion plan, and wherein the dynamic route updates to the traffic dispersion plan are designed to update the traffic dispersion plan based on a delay of navigating the route for the first party and based on congestion in the route for the second party;

communicating routes in the traffic dispersion plan to mobile devices associated with respective parties of the plurality of parties, the respective parties including the first party of the plurality of parties and the second party of the plurality of parties;

receiving location updates from the mobile devices associated with the respective parties of the plurality of parties, the location updates including locations that indicate the delay of navigating the route for the first party and the congestion in the route for the second party; and communicating the dynamic route updates to the mobile devices associated with the respective parties of the plurality of parties;

wherein the dynamic route updates are recalculated in response to receipt of the location updates from the mobile devices that indicate the delay of navigating the route for the first party and the congestion in the route for the second party.

19. The method of claim 18, wherein calculating the traffic dispersion plan comprises:

accessing preferences associated with a party of the plurality of parties; and calculating the traffic dispersion plan with the preferences.

20. At least one non-transitory machine-readable medium including instructions, which when executed by a machine, cause the machine to:

identify a plurality of parties at a venue, each party having at least one person and a mobile device associated with it, wherein the plurality of parties includes a first party and a second party;

identify a location of each of the plurality of parties within the venue;

calculate a traffic dispersion plan designed to disperse the plurality of parties from the venue, the traffic dispersion plan including a route for each of the plurality of parties, wherein the route for the first party differs from the route for the second party;

recalculate dynamic route updates to the traffic dispersion plan, wherein the dynamic route updates are designed to further disperse the plurality of parties from the venue based on deviation from the traffic dispersion plan, and wherein the dynamic route updates to the traffic dispersion plan are designed to update the traffic dispersion plan based on a delay of navigating the route for the first party and based on congestion in the route for the second party;

communicate routes in the traffic dispersion plan to mobile devices associated with respective parties of the plurality of parties, the respective parties including the first party of the plurality of parties and the second party of the plurality of parties;

receive location updates from the mobile devices associated with the respective parties of the plurality of parties, the location updates including locations that indicate the delay of navigating the route for the first party and the congestion in the route for the second party; and communicate the dynamic route updates to the mobile devices associated with the respective parties of the plurality of parties;

wherein the dynamic route updates are recalculated in response to receipt of the location updates from the mobile devices that indicate the delay of navigating the route for the first party and the congestion in the route for the second party.

21. The at least one machine-readable medium of claim 20, wherein the instructions to calculate the traffic dispersion plan comprise instructions to:

access environmental data related to the venue; and calculate the traffic dispersion plan with the environmental data.

22. The at least one machine-readable medium of claim 20, wherein the instructions to communicate routes from the traffic dispersion plan comprise instructions to:

communicate a turn-by-turn route to the mobile devices associated with the respective parties of the plurality of parties.

23. The at least one machine-readable medium of claim 20, wherein the instructions to communicate routes from the traffic dispersion plan comprise instructions to:

communicate a graphical map to the mobile devices associated with the respective parties of the plurality of parties.

* * * * *